United States Patent [19]

Gibson

[11] 4,051,088
[45] Sept. 27, 1977

[54] LIQUID THERMOSETTING COATING COMPOSITIONS

[75] Inventor: David Vincent Gibson, North Bayswater, Australia

[73] Assignee: Dulux Australia Ltd., Australia

[21] Appl. No.: 603,284

[22] Filed: Aug. 11, 1975

[30] Foreign Application Priority Data

Aug. 26, 1974 Australia .............................. 8662/74

[51] Int. Cl.$^2$ ..................... C09D 3/52; C09D 3/56; C09D 3/66
[52] U.S. Cl. ........................................ 260/20; 260/21; 260/22 EP; 260/22 CQ
[58] Field of Search .......... 260/20, 22 EP, 21, 22 CQ

[56] References Cited

U.S. PATENT DOCUMENTS

| 3,023,178 | 2/1962 | Greenlee et al. | 260/22 EP |
|---|---|---|---|
| 3,027,341 | 3/1962 | Boucher et al. | 260/22 EP |
| 3,268,483 | 8/1966 | Klootwijk et al. | 260/22 EP |
| 3,404,018 | 10/1968 | Hicks | 260/22 EP |
| 3,427,266 | 2/1969 | Phillips et al. | 260/22 EP |
| 3,527,720 | 9/1970 | Groff | 260/22 EP |
| 3,567,668 | 3/1971 | Guldenpfennig | 260/21 |
| 3,920,595 | 11/1975 | Anderson et al. | 260/22 CQ |
| 3,956,210 | 5/1976 | Leary et al. | 260/22 EP |

FOREIGN PATENT DOCUMENTS 226,223   1/1959   Australia .......................... 260/22 EP Primary Examiner—Ronald W. Griffin
Attorney, Agent, or Firm—Cushman, Darby & Cushman

[57] ABSTRACT

A liquid thermosetting coating composition wherein the film-forming component is a blend of a. from 60–95% by weight of an acid half-ester of a carboxylic acid anhydride and a polyol, the polyol being the diester of a diepoxide of epoxide equivalent 300 maximum, an autoxidative monocarboxylic fatty acid and a monocarboxylic hydroxy-acid, the acid half-ester having no epoxide groups and on average 1.5–2.5 hydroxyl groups, 1–2 carboxyl groups and 1–2 autoxidative fatty acid residues per molecule, and b. from 5–40% of a suitable crosslinking agent.

The coating compositions have low viscosities at high weight solids contents, and dried films thereof exhibit excellent mechanical properties.

5 Claims, No Drawings

LIQUID THERMOSETTING COATING COMPOSITIONS

This invention relates to novel thermosetting coating compositions and in particular to such coating compositions comprising certain diepoxide derivatives.

Thermosetting coating compositions are compositions which when applied to a substrate and cured give coating films of exceptional hardness and toughness, and are therefore widely used in many industrial applications. A thermosetting coating composition comprises a film-forming component which is usually a mixture of materials, at least one of which is polymeric. During the curing process, the materials of the film-forming component react to form a continuous, cross-linked molecular network whose molecular weight may be considered infinite; it is this network structure which confers advantageous properties on coating films derived from such thermosetting coating compositions. These compositions should ideally be liquids of relatively low viscosity to allow easy application to a substrate. The polymeric materials of the film-forming component are, however, normally solid or semi-solid and an acceptable viscosity is usually only achieved by the addition of large quantities (frequently in excess of 40% by weight of the composition) of a volatile solvent for the polymer. This means that, as a relatively low proportion of the coating composition comprises non-volatile solids, several coats may be required for adequate coverage of the substrate and this is a time-consuming and expensive procedure. In addition, the loss of solvent by evaporation during curing constitutes both a considerable wastage of materials and a significant source of atmospheric pollution. It has been proposed that this problem may be overcome by the use of less highly polymerised (and therefore less viscous) materials, but hitherto the final film properties of coating compositions utilising such materials have been markedly inferior to those utilising the more highly polymerised materials.

We have now found that it is possible to produce thermosetting coating compositions which are readily applicable at unusually high solids contents yet which cure to give coating films which exhibit the excellent properties of those produced from current commercially-available compositions. According to this invention, we provide a liquid thermosetting coating composition the film-forming component of which is a blend of the following constituents;

1. from 60-95% by weight of an acid half-ester of a carboxylic acid anhydride and a polyol, the polyol being a di-ester of a diepoxide, an autoxidative monocarboxylic fatty acid and a monocarboxylic mono-hydroxy acid, characterised in that the diepoxide has an epoxide equivalent of 300 maximum, the acid half-ester is epoxide-free and comprises an average 1.5-2.5 hydroxyl groups, 1-2 carboxyl groups and 1-2 autoxidative residues of monocarboxylic fatty acids per molecule; and
2. from 5-40% by weight of a cross-linking agent reactable with hydroxyl groups of the acid half-ester to form a crosslinked molecular network.

Compositions according to this invention may be readily applied to substrates using conventional application equipment at unusually high solids concentrations (often in excess of 70% by weight) and cured to give tough, hard coating films.

One of the essential constituents of the coating compositions of our invention is the acid half-ester of a carboxylic acid anhydride and a polyol. By "acid half-ester" we mean the reaction product of equimolar quantities of an acid anhydride and a polyol such that the reaction provides one carboxyl group and one ester group per molecule of product. The carboxylic anhydride for use in our invention may be chosen from the wide range of such materials available to the art, for example, maleic, succinic and phthalic anhydrides. Materials comprising an unreacted carboxyl group in addition to the acid anhydride ring are comprehended by our use of the term carboxylic acid anhydride; typical examples of such materials are trimellitic anhydride and maleinised drying or semi-drying oil monocarboxylic fatty acids prepared by the reaction of 1 mol of maleic anhydride with 1 mol of monocarboxylic fatty acid.

The polyol with which the acid anhydride is reacted is a di-ester of a diepoxide an autoxidative monocarboxylic fatty acid and a monocarboxylic hydroxy acid. A diepoxide is a compound comprising two epoxide groups, and for our purposes it may be chosen from among the wide range of diepoxides available to the art. For example, one suitable group of materials is the commercially-available range of diepoxides which are condensation products of epichlorhydrin and 2,2-diphenylol propane. Typical examples of this type are the range of materials marketed under the name "Epikote" (trade mark). Our sole criterion in the choosing of a diepoxide for use in the compositions according to our invention is that the epoxide equivalent, that is, the number of grams of diepoxide containing one gram-equivalent of epoxide group shall be 300 maximum. The autoxidative monocarboxylic fatty acids may be pure unsaturated fatty acids but they are preferably mixtures of such acids which are known to the art as drying or semi-drying oil fatty acids. Examples of such acids are dehydrated castor, linseed, oiticica, safflower, soya bean, sunflower, tung and tall oil fatty acids.

The hydroxy acid may be chosen from any monocarboxylic mono-hydroxy acids known to the art, for example, 12-hydroxy stearic acid, ricinoleic acid and lactic acid.

A typical method of preparation of a suitable acid half-ester would be to prepare a polyol by reacting one mole each of hydroxy-acid and autoxidative fatty acid with one mole of diepoxide, and then reacting the polyol with a carboxylic acid anhyride, the latter reaction being carried out under conditions which will permit the anhydride ring to react but which will not allow a carboxyl group to react, if one be present on the carboxylic acid anhydride. The final acid half-ester must be free of epoxide groups and shall comprise on average 1.5-2.5 hydroxy groups, 1-2 carboxyl groups and 1-2 autoxidative residues of mono-carboxylic fatty acids per molecule, and materials and methods should be chosen such that the acid half-ester conforms to these parameters. Such a choice is within the ability of a person skilled in the art.

The other constituent of the film-forming component is a crosslinking agent reactable with the hydroxyl groups of the acid half-ester. A wide variety of suitable materials are known to the art; see, for example, those described in "The Chemistry of Organic Film-Formers" by D. H. Solomon (1967, John Wiley & Sons, Inc.) at pp 241, 253-255 and 265-267. Among those mentioned are polyisocyanates and low molecular weight alkyl ethers of methylol derivatives of urea, melamine and benzoguanamine and condensation products of formaldehyde and phenol.

We have found that, for our purposes, a particularly useful crosslinking agent is methylol melamine containing 4-6 methylol groups per molecule, the methylol groups being fully etherified with methanol or ethanol. Compounds of this type may be readily prepared, or commercially-available materials of this type such as "Cymel"](trade mark) may be used.

The film-forming component may be prepared by blending together the crosslinking agent and the acid half-ester in proportions of 5%-40% by weight of the crosslinking agent to 95%-60% by weight of acid half-ester. For best results, we have found that the film-forming component should contain 10-30% weight of crosslinking agent and 90%-70% by weight of acid half-ester, and these are our preferred proportions.

These compositions may be pigmented in a conventional manner by dispersing particulate pigment therein and may contain minor amounts of auxiliary materials such as rheology modifiers and pigment dispersants. The compositions may be applied to substrats by conventional means and cured by baking, for example, at 170° C for 30 mins. If required, the cure may be assisted by conventional catalysts used in art-recognised quantities, for example, para-toluene sulphonic acid and phosphoric acid.

The invention is further illustrated by the following examples in which all parts are expressed by weight.

EXAMPLE 1

Preparation of an acid half-ester, its incorporation into a coating composition according to the invention and comparative testing of this composition with a commercially-available composition.

In this example, the diepoxide used was "Epikote" 828 (registered trade mark) which had an opposite equivalent of 200. The acid half-ester prepared therefrom had on average 2 hydroxyl groups, one carboxyl group and one autoxidative residue of a monocarboxylic fatty acid per molecule of half-ester. Examination of the infra-red spectrum of the acid half-ester showed that no epoxide groups were present.

a. Preparation of acid half-ester.

The following materials and proportions were used:

| A. | "Epikote" 828 resin | 400.0 | parts |
|----|---------------------|-------|-------|
|    | safflower fatty acid | 280.0 | parts |
|    | 12-hydroxy stearic acid | 300.0 | parts |
|    | toluene | 110.0 | parts |
|    | n-dimethyl benzylamine | 4.0 | parts |
| B. | succinic anhydride | 100.0 | parts |

The components A were charged to a reaction vessel equipped with stirrer, thermometer, reflux condenser and Dean and Stark adapter. The mixture was heated to 150° C and held there at reflux until the acid value of the mixture fell below 5 mg KOH/gm. The reaction vessel was then cooled to about 80° C, component B was added and the mixture was heated to 180° C and held there until the anhydride was completely reacted as evidenced by the disappearance of the anhydride peak at a wave number of 1760 cm$^{-1}$ in an infra-red spectrum of the mixture. The final product had an acid value of 45 mg KOH/gm and a solids content of 91.0% by weight.

b. Preparation of coating composition.

The following materials were ball-milled together until a dispersion of particle size 10-15 micron (as measured on a Hegmann gauge) was achieved:

| | |
|---|---|
| rutile titanium dioxide | 7.29 parts |
| barytes | 23.44 parts |
| silica | 0.26 parts |
| anti-skinning agent* | 0.20 parts |
| montmorillionite based anti-settling agent+ | 0.15 parts |
| half-ester (as prepared above) (91% solids) | 2.10 parts |
| butyl acetate | 3.87 parts |
| iso-butanol | 1.00 parts |

*A commercial grade of 2-6 ditertiary butyl 4-methyl phenol was used.
+Not an essential ingredient. Any compatible inert anti-settling agent may be used.

The following components were then stirred until homogenous.

| | |
|---|---|
| ball milled mixture (from above) | 38.31 parts |
| acid half-ester (thinned to 80% solids by wt. in methyl ethyl ketone) | 14.20 parts |
| methyl ethyl ketone | 2.00 parts |
| hexamethoxy methyl melamine* | 3.44 parts |

*A commercial product called "Cymel" 301 (registered trade mark) was used.

c. Testing of coating composition.

The resulting coating composition was used as an undercoat for a thermosetting acrylic enamel, the dry film builds being 50 micron for the undercoat and 40 micron for the acrylic enamel. The undercoat was sprayed on to phosphated steel panels and baked in an oven for 30 minutes at 177° C. The acrylic enamel was then applied and baked for 30 minutes at 129° C.

A conventional automotive epoxy ester primer was used as control and a similar series of panels was prepared.

The panels were subjected to the following tests:

a. Test to determine adhesion of undercoat to metal.

This was carried out in accordance with Test Method BI 6-1, Part A of the Ford Motor Company, one of a series of test methods well known to the art. It involves cross scribing a coated panel, applying a strip of adhesive tape over the cross scribes, pulling the strip away and estimating the adhesion from the amount of paint remaining at the cross scribes.

b. Test to determine adhesion of top coat to undercoat.

This was carried out along the lines of Ford Test Method BI6-1, part B, except that the scribes do not go through to the metal but only to the undercoat.

c. Gravellometer test.

In this test a panel is hung vertically in a gravellometer and then bombarded with 400g of fresh gravel blown at the panel by an air blast. The air blast has a pressure of 80 p.s.i. and the bombardment takes place over a period of 10 seconds. The paint film on the panel is assessed on a scale of from 1 to 10 where 10 represents no damage and 1 complete removal of the paint film.

d. Impact test.

This test was carried out in the manner prescribed by Specification 20/38, part 4 (1) of Chrysler Australia Ltd. The panel is subjected to an impact force of 30 in. lb. and examined for cracking.

e. Flexibility test.

This test is identical to that of Ford Test Method BI 5-1. The panel is bent through 180° on a conical mandrel and checked for damage to the film, the film being rated on a flexibility scale of from 1 to 5 with 1 best and 5 worst.

f. Salt spray test.

This test was carried out in the manner prescribed by Ford Test Method BI 5-1 except that the panels were exposed for 350 hours. A line is scribed through the paint film to the metal along the longitudinal axis of the panel before testing and at the end of the test, the extent of corrosion is measured from the scribe line.

g. Humidity test.

This test was carried out in the manner prescribed by Ford Test Method BI 4-2 except that the temperature of the test was raised from 43° C to 60° C, thus making the test more severe. The panels were exposed to a high humidity atmosphere in a Cleveland humidity cabinet for 240 hours and the degree of blistering measured by reference to the "Exposure Standards Manual" of the Federation of Societies for Paint Technology. In this Manual, blisters are rated for size by an arbitrary numerical scale from 1 to 0 (10 representing no blistering) and for frequency by a series of ratings which are as follows; D (dense), MD (medium dense, M (medium) and F (few).

The results were as follows:

|  | Epoxy ester primer | Undercoat according to the invention |
|---|---|---|
| (a) Adhesion to metal | Excellent | Excellent |
| (b) Intercoat adhesion | Good | Good |
| (c) Gravellometer | 9 | 9½ |
| (d) Impact | No cracking | No cracking |
| (e) Flexibility | 2 | 2 |
| (f) Salt spray | 1 mm | 1 mm |
| (g) Humidity | 8F | 8F |

It can be seen that the performance of the undercoat utilising a film-forming component according to the invention is at least equal to that of high-performance epoxy ester primer in all of the tests and, in addition, it has the major advantage that it could be sprayed at 80% wt. solids whereas the epoxy primer could only be sprayed at 45% wt. solids

EXAMPLES 2 – 6

These examples illustrate various coating compositions according to the invention. A number of acid half-esters were prepared according to the method of Example 1, the diepoxide, fatty acid, hydroxy acid and the acid anhydride being replaced by molar equivalent quantities of the compounds set out in the following table. All fall within the parameters set out above

| Example Number | Diepoxide | Fatty Acid | Hydroxy Acid | Acid Anhydride |
|---|---|---|---|---|
| 2 | "Epikote"* 828 | Safflower | 12-hydroxy stearic | maleic |
| 3 | "Epikote" 828 | Safflower | 12-hydroxy stearic | phthalic |
| 4 | "Epikote" 828 | Linseed | ricinoleic | maleic |
| 5 | "Epikote" 828 | Tall | ricinoleic | maleinised tall oil fatty acid |
| 6 | "Epikote"+ 834 | Safflower | 12-hydroxy stearic | maleic |

*trade mark
+ "Epikote" 834 is basically similar to "Epikote" 828 but has an epoxide equivalent of 275.

The half-esters were formulated into coating compositions according to Example 1. The ratio of non-volatile derivative to hexamethoxy methyl melamine was the same for examples 2, 3, 4 and 6 as for the example 1 but for Example 5, the ratio was twice that of Example 1.

The coating compositions were applied, baked and tested as for Example 1.

The results were as follows.

|  | Example 2 | Example 3 | Example 4 | Example 5 | Example 6 |
|---|---|---|---|---|---|
| (a) ahesion to metal | Excellent | Excellent | Excellent | Excellent | Excellent |
| (b) intercoat adhesion | Very good | Good | Good | Very good | Good |
| (c) gravellometer | 9½ | 9½ | 8½ | 8½ | 9 |
| (d) impact | no cracking | no cracking | no cracking | no cracking | no cracking |
| (e) flexibility | 2 | 2 | 1 – 2 | 2 | 2 |
| (f) salt spray | 1 mm | 1-2 m | 1 mm | 0 | 1 mm |
| (g) humidity | 8 MD | 8 F | 8 F | 8 F | 8 MD |

It can be seen that the performances of examples 2–6 are approximately equal to that of the high performance epoxy primer tested in Example 1. These compositions have the major advantage that they can be applied at about 75–80% wt. solids whereas the epoxy primer could only be sprayed at 45% wt. solids.

EXAMPLES 7 – 12

These examples illustrate thermosetting coating compositions comprising diepoxide constituents whose compositions do not conform to our requirements for the following reasons;

a. Example 7 makes use of a diepoxide ("Epikote" 1004) whose epoxide equivalent is 1000;
b. Example 8 has an excessive number of hydroxyl groups;
c. Examples 9 and 10 have no residual carboxyl groups;
d. Example 11 has no autoxidative residues; and
e. Example 12 has only one hydroxyl group.

The acid half-esters for the various examples were prepared as in Example 1; the materials and quantities used are shown in Table 1.

TABLE 1

| Example Number | Diepoxide | Fatty Acid | Hydroxy Acid | Acid Anhydride |
|---|---|---|---|---|
| 7 | "Epikote" 1004 (1 mole) | Safflower (1 mole) | 12-hydroxy stearic (1 mole) | maleic (1 mole) |
| 8 | "Epikote" 828 (1 mole) | Nil | ricinoleic (2 moles) | maleic (1 mole) |
| 9 | "Epikote" 828 (1 mole) | Safflower (1 mole) | Nil | Nil |
| 10 | "Epikote" 828 (1 mole) | Safflower (1 mole) | 12-hydroxy stearic (1 mole) | Nil |
| 11 | "Epikote" 828 (1 mole) | Coconut (1 mole) | 12-hydroxy stearic (1 mole) | maleic (1 mole) |
| 12 | "Epikote" 828 (1 mole) | Coconut & Safflower (1 mole) each | — | maleic (1 mole) |

The resultant half-esters were formulated into coating compositions according to Example 1, and these compositions were applied, baked and tested according to the methods of Example 1. The results are shown in Table 2.

TABLE 2

|  | Example 7 | Example 8 | Example 9 | Example 10 | Example 11 | Example 12 |
|---|---|---|---|---|---|---|
| (a) Adhesion to metal | Very Good | Excellent | — | — | Poor | — |
| (b) Intercoat adhesion | Poor | Good | — | — | Poor | — |
| (c) Gravellometer | 8½ | 8 | — | — | 8 | — |
| (d) Impact | Slight Cracking | Slight Cracking | — | — | Slight Cracking | — |
| (e) Flexibility | 2 | 3 | — | — | 2 | — |
| (f) Salt spray | 1 mm | 1 mm | — | — | 4 mm | — |
| (g) Humidity | 8 MD | 8 F | — | — | 8 D | — |

The coating compositions of Examples 9 and 10 would not cure and could not be tested. The composition of Example 12 was better than those of Examples 9 and 10, but still did not cure sufficiently to allow testing. These three are therefore of no value as coating compositions. The properties of the composition of Example 11 were very poor in comparison with those of the compositions according to the invention. Examples 7 and 8 exhibited reasonable balances of properties, but their major disadvantage is that both have weight solids contents of less than 60% and they therefore offer no significant advantage over conventional coating compositions. Only the compositions prepared according to the present invention and adhering to all the parameters thereof give advantageous results.

EXAMPLES 13 - 14

These examples illustrate the use of different cross-linking agents.

These examples were identical to Example 1 except that the hexamethoxymethyl melamine of that example was replaced in Example 13 by an equal weight of tetramethoxymethyl benzoguanamine (a commerical product called "Cymel" 1123 (trade mark) was used), and in Example 14 by an equal weight of a commercial product called "Methylon"]75108 (trade mark). This product is a low molecular weight methylol derivative of phenol, and is the condensation product of phenol and formaldehyde. The resulting coating compositions were coated on to panels and tested in the same manner as the composition of Example 1. The results were as follows:

|  | Example 13 | Example 14 |
|---|---|---|
| (a) Adhesion to metal | Excellent | Excellent |
| (b) Intercoat adhesion | Good | Good |
| (c) Gravellometer | 9½ | 8½ |
| (d) Impact | No cracking | Slight cracking |
| (e) Flexibility | 2 | 3 |
| (f) Salt spray | 1-2 mm | 1 mm |
| (g) Humidity | 8 MD | 8 F |

The properties of these coating compositions were similar to those of the epoxy ester primer used in Example 1, and they had the extra advantage that they could be applied at 76% weight solids.

We claim:

1. A liquid thermosetting coating composition having a weight solids content of 70% minimum characterised in that the film-forming component thereof is a blend of the following constituents;
    1. from 60–95% by weight of an acid half-ester of a carboxylic acid anhydride and a polyol, the polyol being a di-ester of a diepoxide, an autoxidative monocarboxylic fatty acid and a monocarboxylic hydroxy-acid, further characterised in that the diepoxide has an epoxide equivalent of 300 maximum, the acid half-ester is epoxide-free and comprises on average 1.5–2.5 hydroxy groups, 1–2 carboxyl groups and 1–2 autoxidative residues of monocarboxyolic fatty acids per molecule; and
    2. from 5–40% by weight of a crosslinking agent reactable with hydroxyl groups of the acid half-ester to form a crosslinked molecular net work.

2. A liquid thermosetting coating composition according to claim 1, characterised in that the film-forming component is a blend of from 90%–70% by weight of acid half-ester and from 10–30% of crosslinking agent.

3. A liquid thermosetting coating composition according to claim 1, characterised in that the crosslinking agent is a methylol melamine containing 4–6 methylol groups per molecule, the methylol groups being fully etherified with methanol or ethanol.

4. A liquid thermosetting coating composition according to claim 1, characterised in that the crosslinking agent is a condensation product of a phenol and formaldehyde.

5. A liquid thermosetting coating composition according to claim 1, characterised in that the diepoxide is a condensation product of epichlorhydrin and 2,2-diphenylol propane.

* * * * *